US008882256B2

(12) United States Patent
Chopra et al.

(10) Patent No.: US 8,882,256 B2
(45) Date of Patent: *Nov. 11, 2014

(54) LOW MOLECULAR WEIGHT AMIDE GELLANTS AND METHODS FOR MAKING THE SAME

(75) Inventors: Naveen Chopra, Oakville (CA); Barkev Keoshkerian, Thornhill (CA); Daryl W. Vanbesien, Burlington (CA); Jenny Eliyahu, Maple (CA); Stephan V. Drappel, Toronto (CA); Jeffrey H. Banning, Hillsboro, OR (US); James M. Chappell, Webster, NY (US); Fusheng Xu, Webster, NY (US); Paul J. McConville, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 145 days.

This patent is subject to a terminal disclaimer.

(21) Appl. No.: 13/493,545

(22) Filed: Jun. 11, 2012

(65) Prior Publication Data

US 2013/0328980 A1    Dec. 12, 2013

(51) Int. Cl.
  *C09D 11/00*    (2014.01)
(52) U.S. Cl.
  USPC .......................................................... 347/100
(58) Field of Classification Search
  USPC .......................................................... 347/100
  See application file for complete search history.

(56) References Cited

U.S. PATENT DOCUMENTS

| 5,195,430 | A | 3/1993 | Rise | |
|---|---|---|---|---|
| 5,376,402 | A | 12/1994 | Louks et al. | |
| 7,186,762 | B2 | 3/2007 | Wong et al. | |
| 7,559,639 | B2 | 7/2009 | Belelie et al. | |
| 8,084,637 | B2 * | 12/2011 | Chopra et al. | 560/254 |
| 8,303,838 | B2 * | 11/2012 | Iftime et al. | 252/62.54 |
| 8,348,409 | B2 * | 1/2013 | Wu | 347/99 |
| 8,702,221 | B2 * | 4/2014 | Chopra et al. | 347/100 |
| 2006/0134037 | A1 * | 6/2006 | Cropper et al. | 424/66 |
| 2007/0120910 | A1 | 5/2007 | Odell et al. | |
| 2008/0218540 | A1 | 9/2008 | Iftime et al. | |
| 2009/0038506 | A1 * | 2/2009 | Odell et al. | 106/31.13 |
| 2011/0196057 | A1 * | 8/2011 | Breton et al. | 522/33 |
| 2011/0262643 | A1 * | 10/2011 | Chopra et al. | 427/256 |
| 2011/0263890 | A1 * | 10/2011 | Chopra et al. | 560/145 |
| 2012/0013690 | A1 * | 1/2012 | Breton et al. | 347/100 |
| 2012/0123014 | A1 * | 5/2012 | Chretien et al. | 522/182 |
| 2013/0141505 | A1 * | 6/2013 | Ikeda et al. | 347/104 |

OTHER PUBLICATIONS

Ampo, K., et al., Leveling Viscous Fluids Using Ultrasonic Waves, JJAP, vol. 43, No. 5B (2004) pp. 2857-2861.
Kirk-Othmer Encyclopedia of Chemical Technology, Dimer Acids, vol. 8, 4th Ed. (1992), pp. 223-237.

\* cited by examiner

*Primary Examiner* — Laura Martin
(74) *Attorney, Agent, or Firm* — Pillsbury Winthrop Shaw Pittman LLP

(57) ABSTRACT

Disclosed herein are curable solid inks which are solid at room temperature and molten at an elevated temperature at which the molten ink is applied to a substrate. In particular, the curable solid inks of the present embodiments comprise low molecular weight amide gellants that impart self-leveling capabilities to the inks. Also disclosed herein are methods for making the amide gellant and the inks comprising the amide gellants.

20 Claims, 4 Drawing Sheets

LOW MOLECULAR WEIGHT AMIDE GELLANTS AND METHODS FOR MAKING THE SAME

BACKGROUND

The present embodiments relate to phase change ink compositions that can be used for ink jet printing in a variety of applications. A relatively new type of phase change ink is an ultraviolet (UV) curable solid ink. A UV curable solid ink is characterized by being a gel-like consistency at room temperature and a low viscosity liquid at an elevated temperature for jetting on a substrate. When the ejected ink hits the substrate, it changes phase from the liquid back to its more viscous gel consistency. Because these gel inks solidify rapidly upon cooling, these inks have advantages over water or solvent-based inks that may de-wet from many surfaces, such as plastics, cardboard, and the like. Once the gel ink is exposed to UV radiation, the ink is cured to form a cross-linked polymer matrix resulting in a very hard and durable mark on the substrate.

There remains a desire to level or spread the ink to reduce the so-called "corduroy" effect and achieve more uniform gloss, mask missing jets, and thinner layers required for applications such as packaging. Conventional leveling methods and devices, however, cannot be used with the gel inks due to their unique properties. Since these inks have a paste-like consistency, the inks have very little cohesive strength prior to curing. In addition, the inks are designed such that they have good affinity to many materials. As a result, conventional methods for flattening a layer of ink tend to fail when used with the UV gel ink because the ink will stick to the leveling device and undergo cohesive failure (i.e. splits) leaving residual ink behind on the leveling device. It is not possible to flatten the ink after it has cured either because the polymerized material is extremely tough and non-yielding.

Ampo, K. et al. "Leveling Viscous Fluids Using Ultrasonic Waves", *JJAPS*, (2004), vol 43, pp 2857-2861 describes a method for leveling viscous fluids, in this case a photoresist material, on substrates using ultrasound techniques. In this paper, it has been proposed that such a method may be advantageous over traditional coating methods such as slit nozzle methods (due to unevenness and orientation dependence), and spin-coating (challenging for large substrates and wasteful, due to spilling off of the edges). The paper describes experiments done to level a photoresist material with a viscosity of 10 cps coated onto a non-porous substrate. However, this paper does not address how one could level a viscous gel ink (with viscosity of $10^6$ cps). Moreover, there is no teachings in this publication on how one would level a viscous gel ink on a substrate such a paper.

U.S. Pat. No. 5,376,402 which is hereby incorporated by reference herein in its entirety, describes, in embodiments, an ultrasonically assisted coating method for applying a smooth layer of coating material on a surface of a moving web. In this patent, the coating material is deposited using a die onto a moving web, where the ultrasonic energy generator is applying ultrasonic energy in a variety of modes, directly to the web, to the die itself, and through the air. However, this patent only describes materials deposited by 'contact' approaches, such as slot-fed knife coating, roll-coating, and extrusion coating. Furthermore in the single example cited in the patent, the highest viscosity material tested was a solvent-based rubber coating with a viscosity of 5,000 cps, at a thickness of 63.5 um. Thus, this reference does not address how one would level a viscous gel ink on a substrate.

Thus, there exists a need for a non-contact approach to level the images printed with gelled UV inks prior to curing. The present embodiments are thus directed to curable gel inks, and more particularly, UV curable gel inks and methods specially adapted for leveling these inks on substrates.

SUMMARY

According to embodiments illustrated herein, there is provided a self-leveling curable solid ink comprising a curable wax; one or more monomers; a low molecular weight amide gellant; a photoinitiator; and an optional colorant, wherein the low molecular weight amide gellant has a weight average molecular weight of from about 800 to about 2,500, and has the following formula:

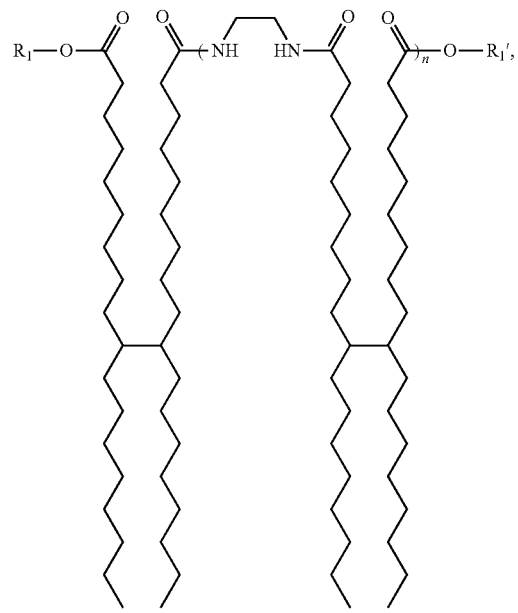

wherein n is 1 to 10, and wherein $R_1$ and $R_1'$ each, independently of the other, are aromatic groups selected from the group consisting of:

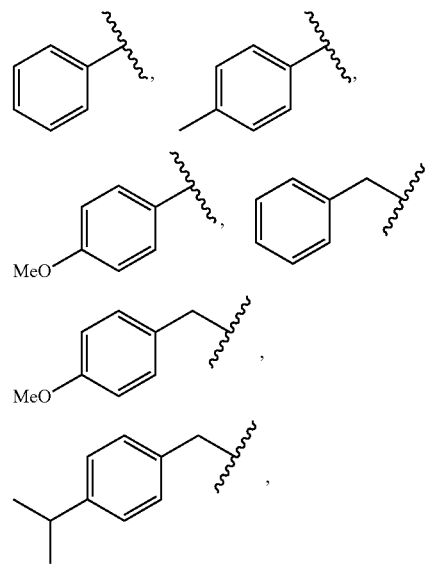

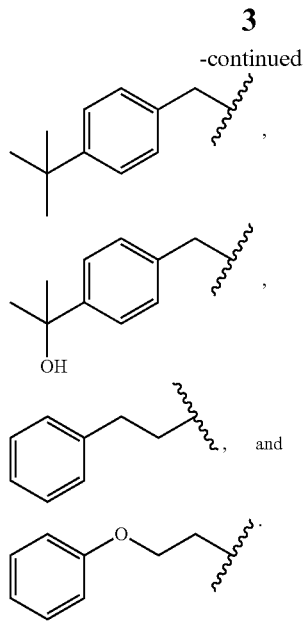

, and

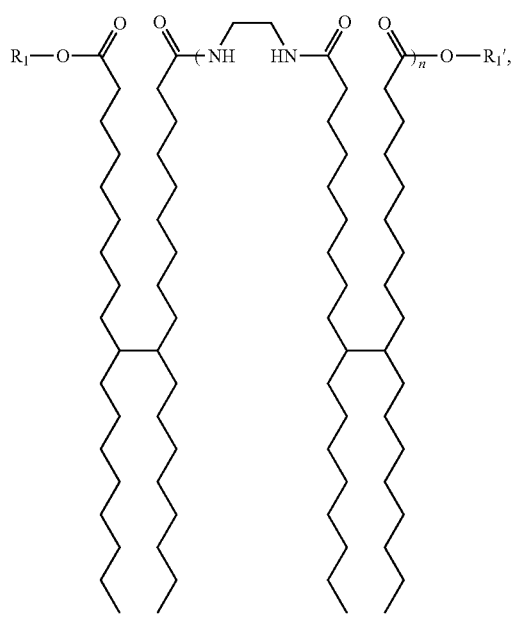

In particular, the present embodiments provide a self-leveling curable solid ink comprising a curable wax; one or more monomers; a low molecular weight amide gellant having a weight average molecular weight of from about 800 to about 2,500 and a number average molecular weight of from about 500 to about 2,500; a photoinitiator; and an optional colorant.

In further embodiments, there is provided a method of jet printing an image, comprising: jetting a self-leveling curable solid ink onto a print substrate to form an image; leveling the image without any physical contact to the self-leveling curable solid ink; and exposing the image to radiation to cure the self-leveling curable solid ink on to the print substrate, wherein the self-leveling curable solid ink comprises a curable wax; one or more monomers; a gellant oligomer mixture composition, a photoinitiator, and an optional colorant, wherein the low molecular weight amide gellant has a weight average molecular weight of from about 800 to about 2,500 and has the following formula:

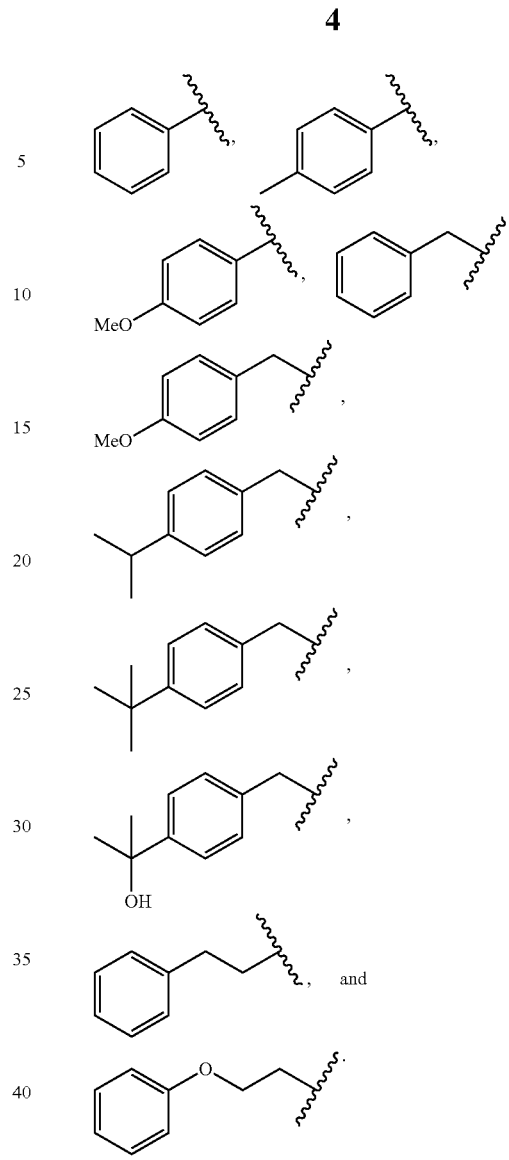

wherein n is 1 to 10, and wherein $R_1$ and $R_1'$ each, independently of the other, are aromatic groups selected from the group consisting of:

, and

BRIEF DESCRIPTION OF THE DRAWINGS

For a better understanding of the present embodiments, reference may be had to the accompanying Figure.

DETAILED DESCRIPTION

Figure 1:
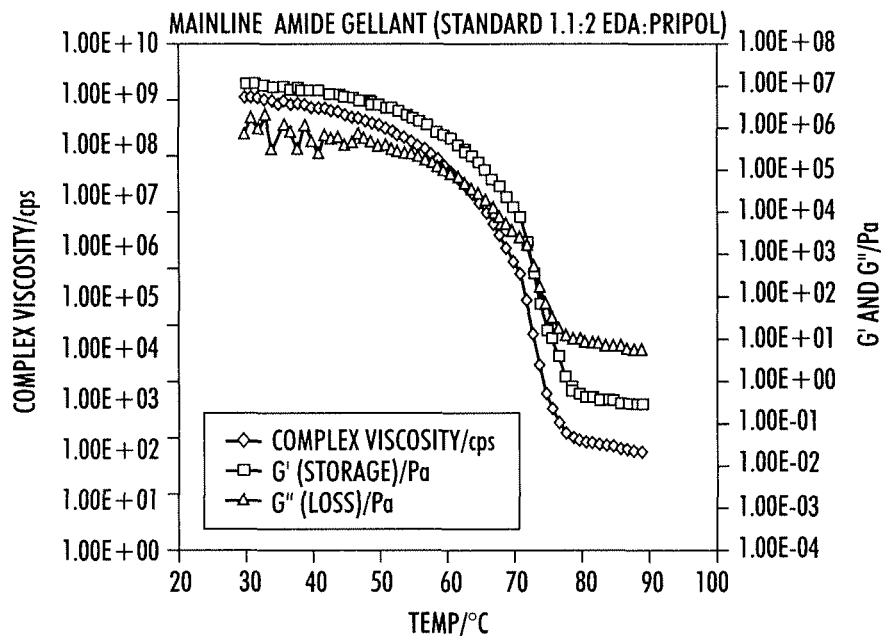
FIG. 1 is a graph showing rheological properties (complex viscosity, G' and G" vs. temperature) of a conventional (main-line) amide gellant used in current curable solid inks.

In the following description, it is understood that other embodiments may be utilized and structural and operational changes may be made without departure from the scope of the present embodiments disclosed herein.

Solid ink technology broadens printing capability and customer base across many markets, and the diversity of printing applications will be facilitated by effective integration of printhead technology, print process and ink materials. As discussed above, while current ink options are successful for printing on various substrates, there is still a need to achieve a non-contact approach to level a UV curable gel ink prior to curing.

The present embodiments are directed generally to ultraviolet (UV) curable solid inks. In particular, the present embodiments provide curable solid inks that exhibit properties that allow the inks to self-level in the printed ink images prior to curing, and methods for making the same. These curable solid inks comprise low molecular weight (Mw) amide gellant compounds having reduced phase-transition temperatures and tuned viscoelastic properties, which has been discovered to impart the self-leveling capability and does not require physical contact to level.

The amide gellant compounds of the present embodiments have the generic structure of the ester-terminated polyamide gellant is as follows:

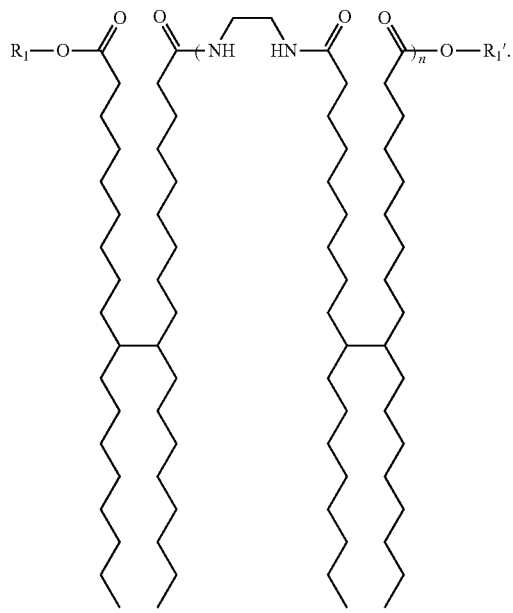

where n is about 0 to about 20, about 0 to about 15, or about 0 to about 10, and where $R_1$ and $R_1'$ each, independently of the other, is a suitable end-capping group (e.g., an alcohol, aromatic, or aromatic alcohol group). In some embodiments, n is 1, 2, 3, 4, 5, 6, 7, 8, 9, 10, 11, 12, 13, 14, 15, 16, 17, 18, 19, or 20. In embodiments, the amide gellant of the present embodiments has a weight average molecular weight (Mw) t of from about 800 to about 2,500, or from about 900 to about 2,400, or from about 1,000 to about 2,300. In embodiments, the amide gellant of the present embodiments has a number average molecular weight (Mn) t of from about 500 to about 2,500, or from about 700 to about 2,300, or from about 900 to about 1,700.

In some embodiments, $R_1$ and $R_1'$ each, independently of the other, is an aromatic group selected from the group consisting of:

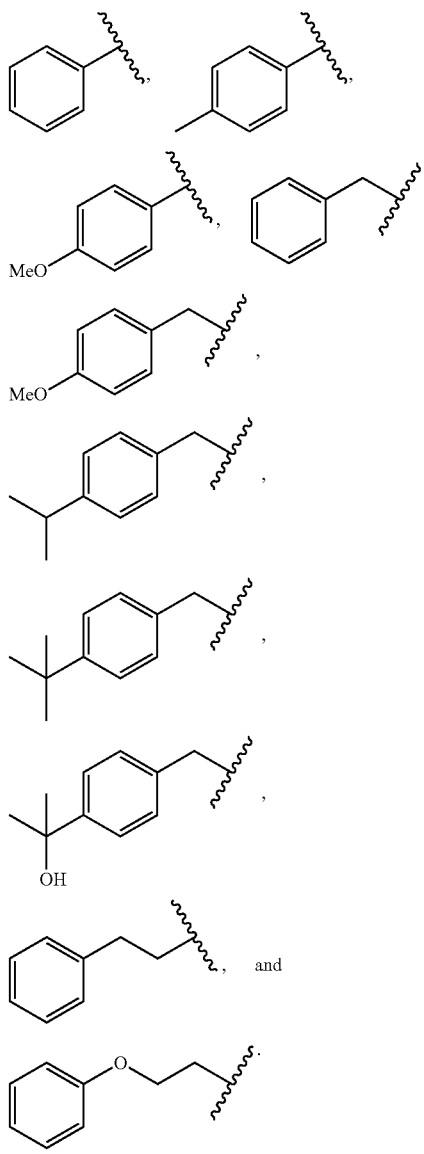

The amide gellant compounds of the present embodiments are made from a two-step process. In the first step, an amide gellant precursor (organoamide) is synthesized by using two equivalents of Pripol (available from Croda Inc. (Edison, N.J.)) and one equivalent of ethylenediamine (EDA), as shown in the scheme below.

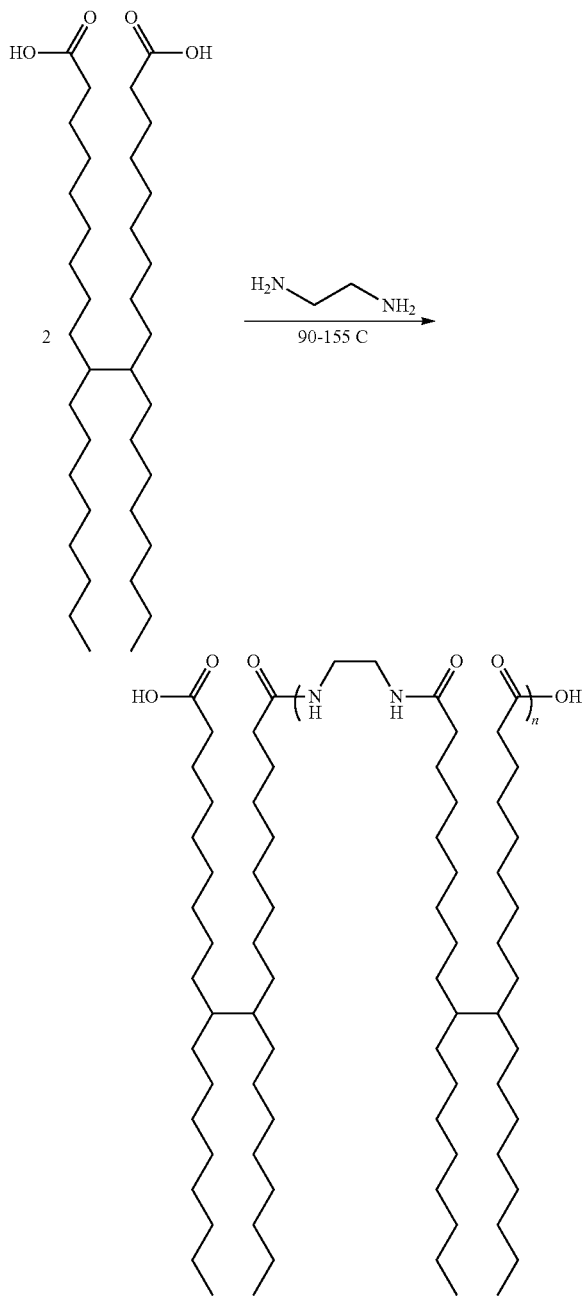

where n may be 0 to about 20, about 0 to about 15, or about 0 to about 10.

In the second step, the organoamide is end-capped with various end cap alcohols to make the esters. During the preparation of the organoamide, oligomers or x-mers of the ester-terminated polyamide gellant are created (end-capping to make the esters in the final gellant does not change the oligomer distribution).

From the two-step process, there is achieved gellant compositions that comprise a blend of oligomers or x-mers of an ester-terminated polyamide gellant disclosed herein. The blend oligomers or x-mers may include monomers or unimers, thus as used herein, the term "oligomer" or "x-mer" includes monomers or unimers in addition to molecules that consist of a plurality of monomers such as dimers, trimers, tetramers, pentamers, etc. The oligomeric amide gellant composition comprise discrete ranges of oligomers (also referred to as "x-mers") that provide optimal gel point and room temperature viscosity to facilitate stable jetting and controlled showthrough of the printed inks.

Stable jetting is a qualitative measurement that refers to the performance of the ink in a piezoelectric printhead. Characteristics of stable jetting include uniformity of drop volumes (i.e. 30 pL), over a range of frequencies, from 24 kHz to 48 kHz, and is manifested in solid lines on the printed page, with little to no jet drop-out which can be seen as dotted lines on the printed page. Controlled showthrough refers to the degree of "haloing" that occurs in which the liquid components of the ink, such as, the monomer, pigment dispersion, etc., pool out and soak into the page. Controlled showthrough is relevant only on porous substrates such as paper and cardboard, but not on foils or plastics, which are non-porous. Showthrough measurements are made by using a specrodensitometer and measurements are made on the printed colour image (front side), and compared to the backside of the printed page.

In some embodiments, the gellant oligomer mixture composition comprises a blend of oligomers made up of two or more (e.g. 2, 3, 4, 5, 6, 7, 8, 9, 10, 11, 12, or more) of the following in any combination or mixture: a unimer, a dimer, a trimer, a tetramer, a pentamer, a hexamer, a heptamer, a octamer, a nonamer, a decamer, a undecamer, and a dodecamer.

In some embodiments, the proportion of each oligomer in the oligomeric mixture is equimolar. In some embodiments, the oligomeric mixture comprises more than one and up to 20 x-mers, wherein x is from about 1 to about 12, and the x-mer may be as described above, including a unimer, dimer, trimer and the like as listed above up to and including a dodecember. The proportion of any of the x-mers present in the oligomeric mixture may be from about including between about 0.5 percent to about 50 percent, between about 10 percent to about 50 percent, and between about 20 percent to about 50 percent.

By controlling the amount of EDA used in the first step, for example, reducing the amount of EDA used relative to the amount of Pripol, the distribution can be shifted to create larger proportions of the lower order x-mers (smaller values of repeat units n). Typically, the amount of EDA relative to the amount of Pripol is expressed as an EDA:Pripol mole ratio. In embodiments, the EDA:Pripol ratio used in synthesizing the amide gellant precursor is modified by reducing from the original EDA:Pripol ratio of 1.1:2 down to from about 0.9:2 to about 0.05:2, or to from about 0.8:2 to about 0.10:2, or to from about 0.75:2 to about 0.25:2. In such embodiments, the composition of the low molecular weight amide gellant mixture as an x-mer composition that has higher proportions of the n=0 (unimer), n=1 (dimer), n=2 (trimer) species. In specific embodiments the low molecular weight amide gellant contains between 30-60% of the n=1 (dimer) species, and the sum of n=0 (unimer), n=1 (dimer), and n=2 (trimer) comprises at least 80% of the total composition, as measured by Matrix-assisted laser desorption/ionisation-time of flight (MALDI-TOF) mass spectrometry.

The storage (G') and loss (G") moduli of the amide gellant are sub-components of complex viscosity and provide a quantitative measure of how rubbery and inelastic the gels are. It has been discovered that lower molecular weight gellants have lower G" values than G' values at lower temperatures, which is reflected in the tan δ or ratio of G"/G'. The gel point is defined as the crossover point of G"/G'. The optimal gel point is dependent on the substrate, as heat dissipations vary. The optimal gel point ranges of the inks according to some embodiments is between ambient room temperature and 70°

C., or more preferably between 30° C. and 60° C., or more preferably between 40° C. and 50° C., although the gel point can be outside of these ranges. The gel point is defined as the point in a temperature-step dynamic viscosity measurement where tan delta (or tan δ) is equal to 1. Tan δ is a unitless computed value defined by the following equation:

$$\text{Tan } \delta = G''/G'$$

where G" is the viscous or loss modulus (in Pa) and G' is the storage or elastic modulus (in Pa). Furthermore, when the tan δ ratio is <1, G" (loss modulus) is less than G' (storage modulus) and the material is defined as a gel. Conversely, when the tan δ ratio is >1, G" (loss modulus) is greater than G' (storage modulus) and the material is no longer a gel. Tan δ>1 is the viscous (non-gel) state and Tan δ<1 is the elastic (gel) state.

Figure 2:
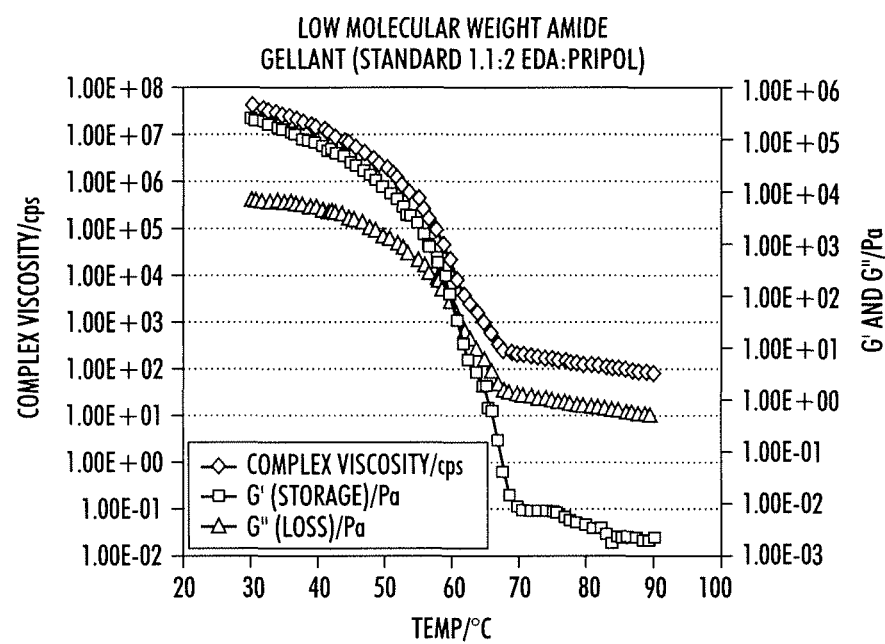
FIG. 2 is a graph showing rheological properties (complex viscosity, G' and G" vs. temperature) of a low molecular weight amide gellant made according to the present embodiments.

The gel points of the inks are directly impacted by the gel points of the gellants alone, which can range from 60-70° C. Furthermore, the molecular weight of the amide gellant drives the gel point. For gellants used in current curable solid inks, the gel point is 72° C., as shown in FIG. 1. For the low molecular weight gellant of the present embodiments, the gel point is significantly lower at 59° C., as shown in FIG. 2. In specific embodiments, the low molecular weight gellant has a gel point of from about 10° C. to about 70° C., or from about 40 to about 69° C., or from about 45 to about 65° C.

Generally, with lower EDA:Pripol ratios, the lower the gel point and room temperature viscosity of the gellant. (In embodiments, the EDA:Pripol ratio is from about 0.9:2 to about 0.05:2, or from about 0.8:2 to about 0.1:2, or from about 0.75:2 to about 0.25:2. In further embodiments, the gel point of the low molecular weight amide gellant is from about 10 to about 70, or from about 40 to about 69, or from about 45 to about 65. In such embodiments, the room temperature viscosity of the low molecular weight amide gellant is from about 500 cps to about $10^9$ cps, or from about 1000 cps to about $5 \times 10^8$ cps, or from about 10,000 cps to about $10^8$ cps.

Figure 3:
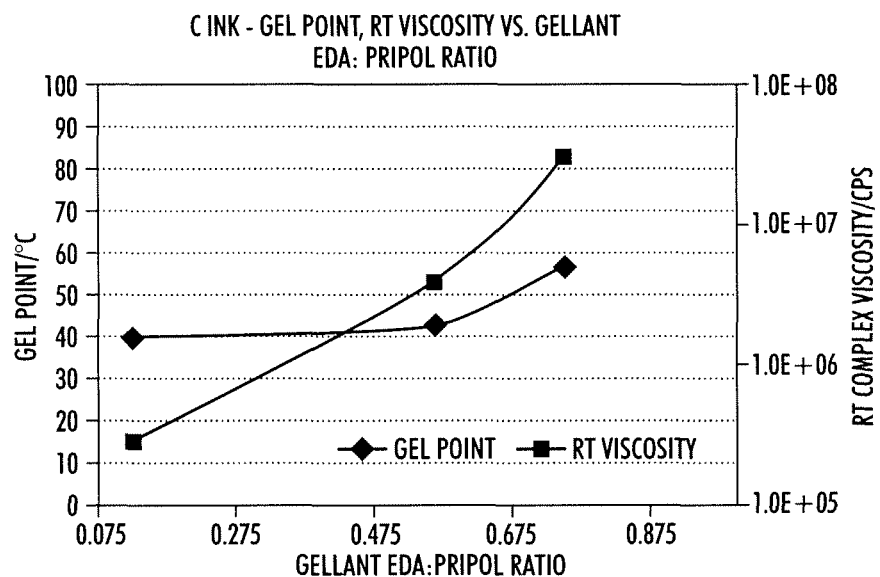
FIG. 3 is a graph showing gel point and room temperature viscosity trends vs. EDA:Pripol ratio for Cyan inks containing varying molecular weight gellants.
Figure 4:
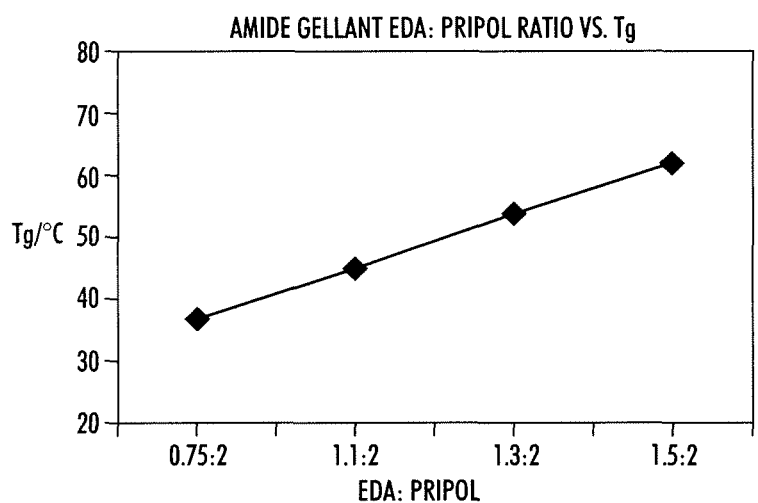
FIG. 4 is a graph showing the correlation between molecular weight and the Tg of the amide gellant of the present embodiments.

The molecular weight of the amide gellants used in the curable solid inks have been shown to have an impact on ink viscosity. Amide gellants of varying molecular weight distribution have been formulated into inks, and the resultant viscosity changes were tracked by a plot of the gel point and room temperature viscosity, as shown in FIG. 3. The Tg (glass transition temperature) has been plotted versus the EDA: Pripol ratio as shown in FIG. 4. As shown in FIGS. 3 and 4, by carefully controlling the molecular weight distribution profile through variation in EDA:Pripol ratios of the amide gellant precursor, the amide gellants begin to lose their elasticity to the point that the inks can self-level or level without the need for any device contact.

Curable Inks

The ink compositions of the present embodiments comprise a low molecular weight amide gellant disclosed herein. The present disclosure also relates to curable inks comprising a low molecular weight amide gellant of the present embodiments.

In some embodiments, the ink compositions of the present embodiments may be solid inks. Solid ink technology broadens printing capability and customer base across many markets, and the diversity of printing applications will be facilitated by effective integration of printhead technology, print process and ink materials. The curable solid ink compositions are characterized by being solid at room temperature, for example, 20-50° C. or 20-27° C., and molten at an elevated temperature at which the molten ink is applied to a substrate.

The ink compositions of the present embodiments may be solid curable inks at room temperature both in the presence and absence of a gellant.

In some embodiments, the ink compositions may further optionally comprise one or more of the following: curable waxes, monomers, colorants, and free-radical photoinitiators, and non-curable resins (e.g., viscosity modifiers).

The amide gellant may be present in the curable solid ink in an amount of from about 1 percent to about 50 percent, from about 1 percent to about 30 percent, from about 2 percent to about 20 percent, from about 5 percent to about 15 percent, and from about 5 percent to about 10 percent by weight of the ink.

A curable wax may be present in the curable solid ink in an amount of from about 0.1 to about 30 percent of the total weight of the curable solid ink. This includes from about 1 percent to about 30 percent, from about 1 percent to about 20 percent, and from about 5 percent to about 10 percent by weight of the ink.

In specific embodiments, the curable monomers may be present in the curable solid ink in an amount of from about 50 to about 95 percent, or from about 60 to about 90 percent by weight of the total weight of the curable solid ink. This includes from about 50 percent to about 80 percent, from about from about 60 percent to about 80 percent, and from about 80 percent to about 95 percent by weight of the ink.

A colorant may be present in the curable solid ink in an amount of from about 0.1 percent to about 10 percent, from about 1 percent to about 10 percent, from about 5 percent to about 10 percent, or from about 1 percent to about 5 percent by weight of the total weight of the curable solid ink.

A photoinitiator may be present in the curable solid ink in an amount of from about 0.5 percent to about 15 percent, from about 5 percent to about 15 percent, from about 1 percent to about 10 percent, from about 5 percent to about 10 percent, and from about 1 percent to about 5 percent by weight of the total weight of the curable solid ink.

The ink compositions can be prepared by any desired or suitable method. For example, each of the components of the ink carrier can be mixed together, followed by heating, the mixture to at least its melting point, for example from about 60° C. to about 110° C., 80° C. to about 100° C. and 85° C. to about 95° C. The colorant may be added before the ink ingredients have been heated or after the ink ingredients have been heated. When pigments are the selected colorants, the molten mixture may be subjected to grinding in an attritor or ball mill apparatus to effect dispersion of the pigment in the ink carrier. The heated mixture is then stirred for about 5 seconds to about 30 minutes or more, to obtain a substantially homogeneous, uniform melt, followed by cooling the ink to ambient temperature (typically from about 20° C. to about 25° C.). The inks are solid at ambient temperature. In a specific embodiment, during the formation process, the inks in their molten state are poured into molds and then allowed to cool and solidify to form ink sticks. Suitable ink preparation techniques are disclosed in U.S. Pat. No. 7,186,762, the disclosure of which is incorporated herein by reference in its entirety.

The ink compositions of the present embodiments may further optionally include one or more conventional additives to take advantage of the known functionality associated with such conventional additives. Such additives may include, for example, defoamer, slip and leveling agents, clarifier, viscosity modifier, adhesive, plasticizer and the like. When present, the optional additives may each, or in combination, be present in the ink in any desired or effective amount, such as from about 1 percent to about 10 percent, from about 5 percent to about 10 percent, or from about 3 percent to about 5 percent by weight of the ink.

In some embodiments, the ink compositions of the present embodiments may be liquid curable inks. In some embodiments, the ink compositions of the present embodiments may further comprise additional gellants, which includes both curable and non-curable gellants.

Properties of the Gellants and Inks

Prepared solid inks of the present embodiments have low jetting temperatures than previously achieved, for example, jetting temperatures of from about 100 to about 70° C., or from about 100 to about 80° C., from about 90 to about 70° C. In particular, the present embodiments also provide faster phase change characteristics, excellent curing performance, increased hardness after curing, and low shrinkage characteristics.

The solid inks of the present embodiments have an optimal gel point of between ambient room temperature and 70° C., or between 30 and 60° C., or between 40 and 50° C., although the gel point can be outside of these ranges. The values of differential showthrough of the present embodiments range from 0.01 to 0.15, or less than 0.10 arbitrary units. Differential showthrough and optical density measurements were made with an X-Rite 938 spectrodensitometer (available from X-Rite (Grand Rapids, Mich.)). Differential showthrough values disclosed represent the difference between underside showthrough and one-paper overside showthrough.

The present embodiments provide low energy ultraviolet (UV) curable pigmented solid inks with high reactivity and minimum shrinkage. These inks of the present embodiments contain a low molecular amide gellant of the present embodiments and are formulated with viscosities in the range of less than 20 cPs at 90° C., or from about 20 to about 5 cPS at 90° C., or from about 15 to about 8 cPs at 90° C., and a shrinkage value of less than 3 percent, or from about 1 to about 3 percent. As used herein, the shrinkage value indicates the shrinkage of the ink upon cooling from a liquid state. In addition, these inks exhibit a hardness after curing much higher than conventional solid inks, such as those commercially available from Xerox Corporation or Océ North America. Significant improvements in curing rate and benchmarked hardness after curing was also shown for these inks as well as improved compatibility between components upon solidification. Extensive studies demonstrated that the concentration of non-curable resins should be less than 5 percent, or from about 1 to about 3 percent, or less than 1 percent by weight. Curing rates were obtained by plotting the hardness versus duration of exposure to UV light in s/ft (Fusions UV doped mercury D-bulb, 600 W/cm) and applying the following expressions:

$$y = m_1 + m_2 \cdot (1 - \exp(-m_3 \cdot x))$$

Initial Hardness = $m_1$

Initial Slope = $m_2 \cdot m_3$

Final Hardness = $m_1 + m_2$ where the initial slope is taken as the initial curing rate. The inks of the present embodiments display curing rates from about 130 to about 250 ft/s, such as from about 180 to about 250 ft/s or from about 200 to about 250 ft/s. Depending on the type of bulb used in the UV curable lamp, the characteristic output used for curing may be from about 200 nm to about 450 nm.

Curable Waxes

The inks of the present embodiments may comprise blends of curable waxes, monomers, a gellant oligomer mixture composition of the present embodiments, optional colorants, and free-radical photoinitiators, and optionally up to 5 percent by weight of non-curable resins, such as viscosity modifiers. The curable waxes, monomers, curable waxes, optional colorants, and free-radical photoinitiators are solid materials below about 40° C., or from below about 40 to below about 30° C., with little or no smell. These components were selected to achieve jetting at temperatures in the range of from about 70 to about 100° C., or from about 80 to about 100° C., or from about 70 to about 90° C. These solid inks thus have robust jetting at elevated temperatures with a viscosity of from about 5 to about 15 cPs, or from about 10 to about 15 cPs, or from about 8 to about 12 cPs at these temperatures, and are solid at room temperature which prevents excessive spreading or migration of the printed droplet on porous substrate. After printing, the compositions are cured to provide robust images.

The curable solid inks of the present embodiments have a pre-cured hardness of from about 0.1 to about 11 or of from about 0.1 to about 5, or of from about 0.1 to about 3. These inks have a post-cured hardness of from about 85 to about 100, or of from about 90 to about 97, or of from about 93 to about 97. The curable solid components include monomers, curable waxes and a gellant oligomer mixture composition of the present embodiments. The curable wax may be a solid at room temperature (25° C.). Inclusion of the wax may promote an increase in viscosity of the ink composition as the composition cools from the application temperature. The curable wax may be any wax component that is miscible with the other components and that will polymerize to form a polymer. The term wax includes, for example, any of the various natural, modified natural, and synthetic materials commonly referred to as waxes.

Suitable examples of curable waxes include waxes that include or are functionalized with curable groups. The curable groups may include, for example, an acrylate, methacrylate, alkene, allylic ether, epoxide, oxetane, and the like. These waxes can be synthesized by the reaction of a wax, such as a polyethylene wax equipped with a carboxylic acid or hydroxyl transformable functional group.

Suitable examples of hydroxyl-terminated polyethylene waxes that may be functionalized with a curable group include mixtures of carbon chains with the structure $CH_3$—$(CH_2)_n$—$CH_2OH$, where there is a mixture of chain lengths, n, where the average chain length can be in the range of about 16 to about 50, and linear low molecular weight polyethylene, of similar average chain length. Suitable examples of such waxes include, but are not limited to, the UNILIN series of materials such as UNILIN 350, UNILIN 425, UNILIN 550 and UNILIN 700 with $M_n$ approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Exemplary Guerbet alcohols include those containing about 16 to about 36 carbons, many of which are commercially available from Jarchem Industries Inc., Newark, N.J. PRIPOL® 2033 (C-36 dimer diol mixture including isomers of the formula

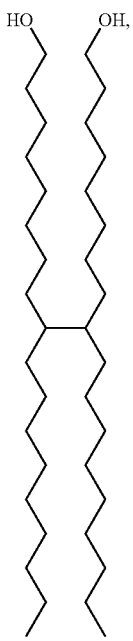 [SMILES: CCCCCCCCCC(CCCCCCCCO)C(CCCCCCCCC)CCCCCCCCO]

as well as other branched isomers that may include unsaturations and cyclic groups, available from Uniqema, New Castle, Del.; further information on $C_{36}$ dimer diols of this type is disclosed in, for example, "Dimer Acids," *Kirk-Othmer Encyclopedia of Chemical Technology*, Vol. 8, 4$^{th}$ Ed. (1992), pp. 223-237, the disclosure of which is totally incorporated herein by reference, may also be used. These alcohols can be reacted with carboxylic acids equipped with UV curable moieties to form reactive esters. Examples of these acids include acrylic and methacrylic acids, available from Sigma-Aldrich Co.

Suitable examples of carboxylic acid-terminated polyethylene waxes that may be functionalized with a curable group include mixtures of carbon chains with the structure $CH_3$—$(CH_2)_n$—COOH, where there is a mixture of chain lengths, n, where the average chain length is about 16 to about 50, and linear low molecular weight polyethylene, of similar average chain length. Suitable examples of such waxes include UNICID® 350, UNICID® 425, UNICID® 550 and UNICID® 700 with $M_n$ equal to approximately 390, 475, 565 and 720 g/mol, respectively. Other suitable waxes have a structure $CH_3$—$(CH_2)_n$—COOH, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Exemplary Guerbet acids include those containing 16 to 36 carbons, many of which are commercially available from Jarchem Industries Inc., Newark, N.J. PRI-POL® 1009 (C-36 dimer acid mixture including isomers of the formula

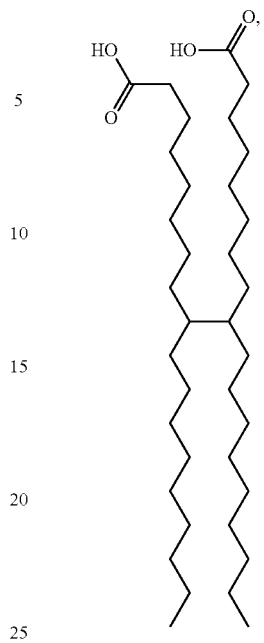

as well as other branched isomers that may include unsaturations and cyclic groups, available from Uniqema, New Castle, Del.; further information on $C_{36}$ dimer acids of this type is disclosed in, for example, "Dimer Acids," *Kirk-Othmer Encyclopedia of Chemical Technology*, Vol. 8, 4$^{th}$ Ed. (1992), pp. 223-237, the disclosure of which is totally incorporated herein by reference, can also be used. These carboxylic acids can be reacted with alcohols equipped with UV curable moieties to form reactive esters. Examples of these alcohols include, but are not limited to, 2-allyloxyethanol from Sigma-Aldrich Co.;

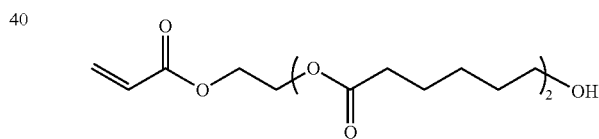

SR495B from Sartomer Company, Inc. (Exton, Pa.); and

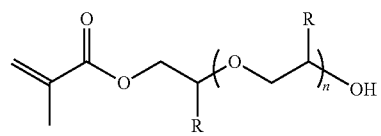

CD572 (R=H, n=10) and SR604 (R=Me, n=4) from Sartomer Company, Inc.

The curable wax can be included in the composition in an amount of from, for example, about 0.1 percent to about 30 percent by weight of the composition, such as from about 0.5 percent to about 20 percent or from about 0.5 percent to 15 percent by weight of the composition.

Monomers

In some embodiments, the ink compositions may further optionally comprise monomers. The monomers that may be used in the present embodiments are, in embodiments, those described in U.S. Pat. No. 7,559,639, which is hereby incorporated by reference. For example, the monomer may be a dimethanol diacrylate cyclohexane difunctional monomer, such as for example, CD-406 from Sartomer (mp=78° C.); an isocyanurate triacrylate trifunctional monomer, such as for example, SR368 from Sartomer (mp=50-55° C.); a behenyl acrylate monofunctional mionomer C18,C20,C22 mixture, such as for example, CD587 from Sartomer (mp=55° C.); an acrylate curable monofunctional acrylate wax C22,C23,C24 mixture, such as for example, UNILIN 350 from Baker Petrolite (Houston, Tex.) (mp=78-83° C.); and a gellant oligomer mixture composition of the present embodiments.

In some embodiments, the monomer is a curable monomer. Thus, ink of the present embodiments may comprise a gellant oligomer mixture composition of the present embodiments, at least one curable wax, at least a curable monomer, an optional photoinitiator, and an optional colorant. In embodiments, if more than one curable liquid monomer is present in the curable phase change ink, the curable liquid monomers are referred to "co-monomers". The co-monomers may be chosen from any suitable curable monomers.

Ink compositions of embodiments may comprise a first co-monomer, due to the solubility and gelling properties of gellant materials, such as, epoxy-polyamide composite gellants, which are useful for producing ink compositions including an ink vehicle having a thermally-driven and reversible gel phase, where the ink vehicle is comprised of curable liquid monomers, such as UV-curable liquid monomers. The gel phase of such ink compositions allows an ink droplet to be pinned to a receiving substrate.

Examples of the at least one curable monomer of the composition include propoxylated neopentyl glycol diacrylate (such as SR9003 from Sartomer), diethylene glycol diacrylate, triethylene glycol diacrylate, butanediol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, isobornyl(meth)acrylate, propoxylated trimethylolpropane triacrylate, ethoxylated trimethylolpropane triacrylate, di-trimethylolpropane tetraacrylate, dipentaerythritol pentaacrylate, ethoxylated pentaerythritol tetraacrylate, propoxylated glycerol triacrylate, isobornyl methacrylate, lauryl acrylate, lauryl methacrylate, neopentyl glycol propoxylate methylether monoacrylate, isodecylmethacrylate, caprolactone acrylate, 2-phenoxyethyl acrylate, isooctylacrylate, isooctylmethacrylate, tricyclodecane dimethanol diacrylate, dioxane glycol diacrylate, mixtures thereof and the like. As relatively non-polar monomers, mention may be made of isodecyl(meth)acrylate, caprolactone acrylate, 2-phenoxyethyl acrylate, isooctyl(meth)acrylate, and butyl acrylate. In addition, multifunctional acrylate monomers/oligomers may be used not only as reactive diluents, but also as materials that can increase the cross-link density of the cured image, thereby enhancing the toughness of the cured images.

The term "curable monomer" is also intended to encompass curable oligomers, which may also be used in the composition. Examples of suitable curable oligomers that may be used in the compositions have a low viscosity, for example, from about 50 cPs to about 10,000 cPs, such as from about 75 cPs to about 7,500 cPs or from about 100 cPs to about 5,000 cPs. Examples of such oligomers may include CN549, CN131, CN131B, CN2285, CN 3100, CN3105, CN132, CN133, CN 132, available from Sartomer Company, Inc., Exeter, Pa., Ebecryl 140, Ebecryl 1140, Ebecryl 40, Ebecryl 3200, Ebecryl 3201, Ebecryl 3212, available from Cytec Industries Inc, Smyrna Ga., PHOTOMER 3660, PHOTOMER 5006F, PHOTOMER 5429, PHOTOMER 5429F, available from Cognis Corporation, Cincinnati, Ohio, LAROMER PO 33F, LAROMER PO 43F, LAROMER PO 94F, LAROMER UO 35D, LAROMER PA 9039V, LAROMER PO 9026V, LAROMER 8996, LAROMER 8765, LAROMER 8986, available from BASF Corporation, Florham Park, N.J., and the like. As multifunctional acrylates and methacrylates, mention may also be made of pentaerythritol tetra(meth)acrylate, 1,2 ethylene glycol di(meth)acrylate, 1,6 hexanediol di(meth)acrylate, 1,12-dodecanol di(meth)acrylate, tris (2-hydroxy ethyl)isocyanurate triacrylate, propoxylated neopentyl glycol diacrylate, hexanediol diacrylate, tripropylene glycol diacrylate, dipropylene glycol diacrylate, amine-modified polyether acrylates (available as PO 83 F, LR 8869, and/or LR 8889 (all available from BASF Corporation)), trimethylolpropane triacrylate, glycerol propoxylate triacrylate, dipentaerythritol penta-/hexa-acrylate, ethoxylated pentaerythritol tetraacrylate (available from Sartomer Co. Inc. as SR399LV and SR494), and the like.

Additional examples of the curable monomers include acrylated esters, acrylated polyesters, acrylated ethers, acrylated polyethers, acrylated epoxies, urethane acrylates, and pentaerythritol tetraacrylate. Specific examples of suitable acrylated oligomers include, acrylated polyester oligomers, such as CN2262 (Sartomer Co.), EB 812 (Cytec Surface Specialties), EB 810 (Cytec Surface Specialties), CN2200 (Sartomer Co.), CN2300 (Sartomer Co.), and the like; acrylated urethane oligomers, such as EB270 (UCB Chemicals), EB 5129 (Cytec Surface Specialties), CN2920 (Sartomer Co.), CN3211 (Sartomer Co.), and the like; and acrylated epoxy oligomers, such as EB 600 (Cytec Surface Specialties), EB 3411 (Cytec Surface Specialties), $CN_{22}O_4$ (Sartomer Co.), CN110 (Sartomer Co.), and the like.

In embodiments, the curable monomer may be chosen from short-chain alkyl glycol diacrylates or ether diacrylates or from acrylates having short-chain alkyl ester substituents, such as caprolactone acrylate, and the commercially available products CD536, CD 2777, CD585 and CD586 (available from Sartomer Co. Inc.).

In addition, the curable monomer or oligomer may variously function as a viscosity reducer, as a binder when the composition is cured, as an adhesion promoter, as a reactive diluent and as a crosslinking agent that can increase the crosslink density of the cured image, thereby enhancing the toughness of the cured images. Suitable monomers may have a low molecular weight, low viscosity, and low surface tension and comprise functional groups that undergo polymerization upon exposure to radiation such as UV light.

Initiator

As mentioned above, the ink compositions may further optionally comprise an initiator, such as, for example, a photoinitiator. Such an initiator is desirable for assisting in curing of the ink. In embodiments, a photoinitiator that absorbs radiation, for example UV light radiation, to initiate curing of the curable components of the ink may be used. As the photoinitiator for ink compositions that are cured by free-radical polymerization, for instance, ink compositions containing acrylate groups or inks comprised of polyamides, mention may be made of photoinitiators such as benzophenones, benzoin ethers, benzil ketals, α-hydroxyalkylphenones, α-alkoxyalkylphenones α-aminoalkylphenones and acylphosphine photoinitiators sold under the trade designations of IRGACURE and DAROCUR from Ciba. Specific examples of suitable photoinitiators include 2,4,6-trimethylbenzoyldiphenylphosphine oxide (available as BASF LUCIRIN TPO); 2,4,6-trimethylbenzoylethoxyphenylphosphine oxide (available as BASF LUCIRIN TPO-L); bis(2,4,6-trimethylbenzoyl)-phenyl-phosphine oxide (available as Ciba IRGACURE 819) and other acyl phosphines; 2-methyl-1-(4- methylthio)phenyl-2-(4-morphorlinyl)-1-propanone (available as Ciba IRGACURE 907) and 1-(4-(2-hydroxyethoxy) phenyl)-2-hydroxy-2-methylpropan-1-one (available as Ciba IRGACURE 2959); 2-benzyl 2-dimethylamino 1-(4-morpholinophenyl)butanone-1 (available as Ciba IRGACURE 369); 2-hydroxy-1-(4-(4-(2-hydroxy-2-methylpropionyl)-benzyl)-phenyl)-2-methylpropan-1-one(available as Ciba IRGACURE 127); 2-dimethylamino-2-(4-methylbenzyl)-1-(4-morpholin-4-ylphenyl)-butanone (available as Ciba IRGACURE 379); titanocenes; isopropylthioxanthone; 1-hydroxy-cyclohexylphenylketone; benzophenone; 2,4,6-trimethylbenzophenone; 4-methylbenzophenone; diphenyl-(2,4, 6-trimethylbenzoyl)phosphine oxide; 2,4,6-trimethylbenzoylphenylphosphinic acid ethyl ester; oligo(2-hydroxy-2-methyl-1-(4-(1-methylvinyl)phenyl)propanone); 2-hydroxy-2-methyl-1-phenyl-1-propanone; benzyl-dimethylketal; hydroxyalkylphenylketone (available as Fratelli Lamberti ESACURE KP150) and mixtures thereof. Mention may also be made of amine synergists, which are described as co-initiators that donate a hydrogen atom to a photoinitiator and thereby form a radical species that initiates polymerization (amine synergists can also consume oxygen dissolved in the ink—as oxygen inhibits free-radical polymerization its consumption increases the speed of polymerization), for example such as ethyl-4-dimethylaminobenzoate and 2-ethylhexyl-4-dimethylaminobenzoate. This list is not exhaustive, and any known photoinitiator that initiates the free-radical reaction upon exposure to a desired wavelength of radiation such as UV light can be used without limitation.

The photoinitiator may absorb radiation of about 200 to about 420 nm wavelengths in order to initiate cure, although use of initiators that absorb at longer wavelengths, such as the titanocenes that may absorb up to 560 nm, can also be used without restriction.

The total amount of initiator included in the ink composition may be from, for example, about 0.5 to about 15 percent by weight, such as from about 1 to about 10 percent by weight, of the ink composition.

Radiation curable phase change inks generally comprise at least one curable monomer, a gellator, a colorant, and a radiation activated initiator, specifically a photoinitiator, that initiates polymerization of curable components of the ink, specifically of the curable monomer. U.S. Pat. No. 7,279,587 to Odell et al., the disclosure of which is totally incorporated herein by reference, discloses photoinitiating compounds useful in curable solid ink compositions. U.S. Patent Publication 2007/0120910 to Odell et al., which is hereby incorporated by reference herein in its entirety, describes, in embodiments, a solid ink comprising a colorant, an initiator, and an ink vehicle.

Optionally, the ink compositions can also contain an amine synergist, which are co-initiators which can donate a hydrogen atom to a photoinitiator and thereby form a radical species that initiates polymerization, and can also consume dissolved oxygen, which inhibits free-radical polymerization, thereby increasing the speed of polymerization. Examples of suitable amine synergists include (but are not limited to) ethyl-4-dimethylaminobenzoate, 2-ethylhexyl-4-dimethylaminobenzoate, and the like, as well as mixtures thereof.

Initiators for inks disclosed herein can absorb radiation at any desired or effective wavelength, for example, from about 4 nanometers to about 560 nanometers, or from about 200 nanometers to about 560 nanometers, or from about 200 nanometers to about 420 nanometers, although the wavelength can be outside of these ranges.

Optionally, the photoinitiator is present in the phase change ink in any desired or effective amount, for example from about 0.5 percent to about 15 percent by weight of the ink composition, or from about 1 percent to about 10 percent by weight of the ink composition, although the amount can be outside of these ranges.

Colorant

In some embodiments, the ink compositions may further optionally comprise colorant. Any desired or effective colorant can be employed in the ink compositions, including dyes, pigments, mixtures thereof, and the like, provided that the colorant can be dissolved or dispersed in the ink vehicle and is compatible with the other ink components. Pigments, which are typically cheaper and more robust than dyes, may be included in the curable phase change ink composition. The color of many dyes can be altered by the polymerization process occurring during the curing stage, presumably from attack of their molecular structure by the free radicals. The compositions can be used in combination with conventional ink-colorant materials, such as Color Index (C.I.) Solvent Dyes, Disperse Dyes, modified Acid and Direct Dyes, Basic Dyes, Sulphur Dyes, Vat Dyes, and the like.

Pigments are suitable colorants for the curable phase change inks. Examples of suitable pigments include PALIOGEN Violet 5100 (commercially available from BASF); PALIOGEN Violet 5890 (commercially available from BASF); HELIOGEN Green L8730 (commercially available from BASF); LITHOL Scarlet D3700 (commercially available from BASF); SUNFAST Blue 15:4 (commercially available from Sun Chemical); Hostaperm Blue B2G-D (commercially available from Clariant); Hostaperm Blue B4G (commercially available from Clariant); Permanent Red P-F7RK; Hostaperm Violet BL (commercially available from Clariant); LITHOL Scarlet 4440 (commercially available from BASF); Bon Red C (commercially available from Dominion Color Company); ORACET Pink RF (commercially available from Ciba); PALIOGEN Red 3871 K (commercially available from BASF); SUNFAST Blue 15:3 (commercially available from Sun Chemical); PALIOGEN Red 3340 (commercially available from BASF); SUNFAST Carbazole Violet 23 (commercially available from Sun Chemical); LITHOL Fast Scarlet L4300 (commercially available from BASF); SUNBRITE Yellow 17 (commercially available from Sun Chemical); HELIOGEN Blue L6900, L7020 (commercially available from BASF); SUNBRITE Yellow 74 (commercially available from Sun Chemical); SPECTRA PAC C Orange 16 (commercially available from Sun Chemical); HELIOGEN Blue K6902, K6910 (commercially available from BASF); SUNFAST Magenta 122 (commercially available from Sun Chemical); HELIOGEN Blue D6840, D7080 (commercially available from BASF); Sudan Blue OS (commercially available from BASF); NEOPEN Blue FF4012 (commercially available from BASF); PV Fast Blue B2GO1 (commercially available from Clariant); IRGALITE Blue BCA (commercially available from Ciba); PALIOGEN Blue 6470 (commercially available from BASF); Sudan Orange G (commercially available from Aldrich), Sudan Orange 220 (commercially available from BASF); PALIOGEN Orange 3040 (BASF); PALIOGEN Yellow 152, 1560 (commercially available from BASF); LITHOL Fast Yellow 0991 K (commercially available from BASF); PALIOTOL Yellow 1840 (commercially available from BASF); NOVOPERM Yellow FGL (commercially available from Clariant); Ink Jet Yellow 4G VP2532 (commercially available from Clariant); Toner Yellow HG (commercially available from Clariant); Lumogen Yellow D0790 (commercially available from BASF); Suco-Yellow L1250 (commercially available from BASF); Suco-Yellow D1355 (commercially available from BASF); Suco Fast Yellow DI355, DI351 (commercially available from BASF); HOSTAPERM Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL Pink D4830 (commercially available from BASF); CINQUASIA Magenta (commercially available from DU PONT); PALIOGEN Black L0084 (commercially available from BASF); Pigment Black K801 (commercially available from BASF); and carbon blacks such as REGAL 330™ (commercially available from Cabot), Nipex 150 (commercially available from Degusssa) Carbon Black 5250 and Carbon Black 5750 (commercially available from Columbia Chemical), and the like, as well as mixtures thereof.

The colorant may be present in the ink in any desired or effective amount to obtain the desired color or hue such as, for example, at least from about 0.1 percent by weight of the ink to about 50 percent by weight of the ink, or from at least from about 0.2 percent by weight of the ink to about 20 percent by weight of the ink, or at least from about 0.5 percent by weight of the ink to about 10 percent by weight of the ink.

Ink Vehicle or Carrier

In some embodiments, the ink compositions may further optionally comprise an ink vehicle or carrier. In specific embodiments, the ink vehicles disclosed herein can comprise any suitable curable monomer or prepolymer. The curable monomer or prepolymer and curable wax together can form more than about 50 percent, or at least 70 percent, or at least 80 percent by weight of the ink. Examples of suitable materials include radically curable monomer compounds, such as acrylate and methacrylate monomer compounds, which are suitable for use as phase change ink carriers. Specific examples of relatively nonpolar acrylate and methacrylate monomers include (but are not limited to) isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, and the like, as well as mixtures and combinations thereof. In addition, multifunctional acrylate and methacrylate monomers and oligomers can be included in the phase change ink carrier as reactive diluents and as materials that can increase the crosslink density of the cured image, thereby enhancing the toughness of the cured images. Examples of suitable multifunctional acrylate and methacrylate monomers and oligomers include (but are not limited to) pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl)isocyanurate triacrylate, propoxylated neopentyl glycol diacrylate (available from Sartomer Co. Inc. as SR9003), hexanediol diacrylate, tripropylene glycol diacrylate, dipropylene glycol diacrylate, amine modified polyether acrylates (available as PO 83 F, LR 8869, and/or LR 8889 (all available from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR494), and the like, as well as mixtures and combinations thereof. When a reactive diluent is added to the ink carrier material, the reactive diluent is added in any desired or effective amount, for example, from about 1 percent to about 80 percent by weight of the carrier, or from about 35 percent to about 70 percent by weight of the carrier, although the amount of diluent can be outside of these ranges.

In specific embodiments, the ink vehicles disclosed herein can comprise any suitable photoinitiator. Examples of specific initiators include, but are not limited to, IRGACURE® 127, IRGACURE® 379, and IRGACURE® 819, all commercially available from Ciba Specialty Chemicals, among others. Further examples of suitable initiators include (but are not limited to) benzophenones, benzophenone derivatives, benzyl ketones, α-alkoxy benzyl ketones, monomeric hydroxyl ketones, polymeric hydroxyl ketones, α-amino ketones, alkoxy ketones, acyl phosphine oxides, metallocenes, benzoin ethers, benzil ketals, α-hydroxyalkylphenones, α-aminoalkylphenones, acylphosphine photoinitiators sold under the trade designations of IRGACURE® and DAROCUR® from Ciba, and the like. Specific examples include 1-hydroxy-cyclohexylphenylketone, benzophenone, 2-benzyl-2-(dimethylamino)-1-(4-(4-morphorlinyl)phenyl)-1-butanone, 2-methyl-1-(4-methylthio)phenyl-2-(4-morphorlinyl)-1-propanone, diphenyl-(2,4,6-trimethylbenzoyl)phosphine oxide, phenyl bis(2,4,6-trimethylbenzoyl)phosphine oxide, benzyl-dimethyl ketal, isopropylthioxanthone, 2,4,6-trimethylbenzoyldiphenylphosphine oxide (available as BASF LUCIRIN® TPO), 2,4,6-trimethylbenzoylethoxyphenylphosphine oxide (available as BASF LUCIRIN® TPO-L), bis(2,4,6-trimethylbenzoyl)-phenyl-phosphine oxide (available as Ciba IRGACURE® 819) and other acyl phosphines, 2-methyl-1-(4-methylthio)phenyl-2-(4-morphorlinyl)-1-propanone (available as Ciba IRGACURE® 907) and 1-(4-(2-hydroxyethoxy)phenyl)-2-hydroxy-2-methylpropan-1-one (available as Ciba IRGACURE® 2959), 2-benzyl 2-dimethylamino-1-(4-morpholinophenyl)butanone-1 (available as Ciba IRGACURE® 369), 2-hydroxy-1-(4-(4-(2-hydroxy-2-methylpropionyl)-benzyl)-phenyl-2-methyl-propan-1-one (available as Ciba IRGACURE® 127), 2-dimethylamino-2-(4-methylbenzyl)-1-(4-morpholin-4-ylphenyl)-butanone (available as Ciba IRGACURE® 379), titanocenes, isopropylthioxanthone, 1-hydroxy-cyclohexylphenylketone, benzophenone, 2,4,6-trimethylbenzophenone, 4-methylbenzophenone, diphenyl-(2,4,6-trimethylbenzoyl)phosphine oxide, 2,4,6-trimethylbenzoylphenylphosphinic acid ethyl ester, oligo(2-hydroxy-2-methyl-1-(4-(1-methylvinyl)phenyl)propanone), 2-hydroxy-2-methyl-1-phenyl-1-propanone, benzyl-dimethylketal, arylsulphonium slats, aryl iodonium salt, and the like, as well as mixtures thereof.

Methods of Use

According to some embodiments, methods are provided for using the curable solid ink for jet printing text. In such embodiments, the method comprises jetting a curable solid ink onto an intermediate substrate to form an intermediate image, transferring the intermediate image onto a substrate to form a transferred image, and exposing the transferred image to radiation having wavelengths in the range of from about 180 nanometers to about 500 nanometers to cure the curable solid ink. In embodiments, the jetting step is performed at above 70° C., or at from about 70 to about 100° C.

Any suitable printing device may used herein. In one embodiment, the apparatus is an ink jet printing device as described in commonly assigned, co-pending U.S. Patent Publication No. 2008/0218540, incorporated by reference in its entirety, that includes at least an ink jet print head and a print region surface toward which ink is jetted from the ink jet print head, wherein a height distance between the ink jet print head and the print region surface is adjustable.

The apparatus, as well as the methods herein, may be employed with any desired printing system and marking material suitable for applying a marking material in an imagewise pattern to an intermediate transfer member or directly to an image receiving substrate, piezoelectric ink jet printing (both with inks liquid at room temperature and with phase change inks), acoustic ink jet printing (both with inks liquid at room temperature and with phase change inks), thermal transfer printing, gravure printing, and the like. For the purpose of illustration, a piezoelectric phase change ink jet printer for applying marking material in an imagewise pattern to an intermediate transfer member is described.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. In one specific embodiment, the printing apparatus employs a piezoelectric printing process wherein droplets of the ink are caused to be ejected in imagewise pattern by oscillations of piezoelectric vibrating members. Inks as disclosed herein can also be employed in other hot melt printing processes, such as hot melt acoustic ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX Digital Color Gloss, Sappi Warren Papers LUSTROGLOSS, specialty papers such as Xerox DURAPAPER, and the like, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

According to some embodiments, there is provided a method of jet printing an image, comprising: jetting a curable solid ink onto a print substrate to form an image; and exposing the image to radiation to cure the curable solid ink on to the print substrate, wherein the curable solid ink comprises a curable wax, an optional non-curable component, one or more monomers, an optional colorant, a gellant oligomer mixture composition of the present embodiments, and a photoinitiator.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1A

Synthesis of Low Molecular Weight Organoamide Precursor (0.25:2 EDA:Pripol)

To a 1 L kettle equipped with polytetrafluoroethylene (PTFE) paddle, dropping funnel, Dean-Stark trap, reflux condenser, and thermocouple probe, was added Pripol 1009 (dimer acid, acid#=194 mg KOH/g; available from Cognis Corp.) (454.27 g, 785 mmol). The kettle was purged with Argon and heated to 90° C. with stirring. Next, ethylenediamine (6.55 ml, 98 mmol; available from Huntsman Chemical Corp.) was added to the dropping funnel, and slowly added to the Pripol dropwise over 5-10 minutes. The kettle was wrapped with cotton wool and foil to maintain temperature, heated to 120° C., then ramped up to 150° C., and finally to 170° C. and held for 4½ hours. Water byproduct was collected in the Dean-Stark trap. After 4.5 hours, the reactor contents were poured into a foil pan to cool and solidify. Organoamide was isolated as a golden viscous liquid (acid#=168.72 mg/g).

Example 1B

Synthesis of Low Molecular Weight Amide Gellant Using Organoamide Precursor (0.25:2 EDA:Pripol)

To a 2 L stainless steel Buchi reactor equipped with 4-blade steel impeller, baffle, and condenser was added low molecular weight organoamide (423.4 g, acid number=168.72, 423.4 mmol) via the addition port, using a heat gun to melt the materials. Next, the reactor was purged with N$_2$ gas at 3 SCFH (standard cubic feet per hour) flow rate, and heated to 210° C., and mixing at 450 RPM was started. Next, 2-phenoxyethanol (211 g, 1527 mmol, Aldrich Chemicals) and Fascat 4100 (0.42 g, 2 mmol, Arkema Inc.) were premixed in a beaker, and added to the reaction. The reaction port was closed, and the reaction was held at 210° C. for 3 hours. After 3 hours, 15g more 2-phenoxyethanol was added, and the reaction was continued for an additional 4 hours. After the reaction was completed, the molten gellant product was discharged into a foil pan and allowed to cool to room temperature. The product was an amber-colored jelly. Acid number=0.65.

Example 2A

Synthesis of Low Molecular Weight Organoamide Precursor (0.6:2 EDA:Pripol) (use NC1049 NC30890-21)

To a 1 L kettle equipped with polytetrafluoroethylene (PTFE) paddle, dropping funnel, Dean-Stark trap, reflux condenser, and thermocouple probe, was added Pripol 1009 (dimer acid, acid#=194 mg KOH/g; available from Cognis Corp.) (454.38 g, 785 mmol). The kettle was purged with Argon and heated to 90° C. with stirring. Next, ethylenediamine (15.73 ml, 236 mmol; available from Huntsman Chemical Corp.) was added to the dropping funnel, and slowly added to the Pripol dropwise over 5-10 minutes. The kettle was wrapped with cotton wool and foil to maintain temperature, heated to 120° C., then ramped up to 150° C., and finally to 170° C. and held for 4½ hours. Water byproduct was collected in the Dean-Stark trap. After 4.5 hours, the reactor contents were poured into a foil pan to cool and solidify. Organoamide was isolated as a golden viscous semi-solid (acid#=133.68 mg/g).

Example 2B

Synthesis of Low Molecular Weight Amide Gellant Using Organoamide Precursor (0.6:2 EDA:Pripol)

To a 2 L stainless steel Buchi reactor equipped with 4-blade steel impeller, baffle, and condenser was added low molecular weight organoamide (454.7 g, acid number=133.68, 542 mmol) via the addition port, using a heat gun to melt the materials. Next, the reactor was purged with N$_2$ gas at 3 SCFH (standard cubic feet per hour) flow rate, and heated to 210° C., and mixing at 450 RPM was started. Next, 2-phenoxyethanol (180 g, 1300 mmol, Aldrich Chemicals) and Fascat 4100 (0.45 g, 2 mmol, Arkema Inc.) were premixed in a beaker, and added to the reaction. The reaction port was closed, and the reaction was held at 210° C. for 3 hours. After 3 hours, 14.5 g more 2-phenoxyethanol was added, and the reaction was continued for an additional 4 hours. After the reaction was completed, the molten gellant product was discharged into a foil pan and allowed to cool to room temperature. The product was a golden-colored soft gel. Acid number=3.44.

Example 3A

Synthesis of Low Molecular Weight Organoamide Precursor (0.75:2 EDA:Pripol)

To a 1 L kettle equipped with polytetrafluoroethylene (PTFE) paddle, dropping funnel, Dean-Stark trap, reflux condenser, and thermocouple probe, was added Pripol 1009 (dimer acid, acid#=194 mg KOH/g; available from Cognis Corp.) (400.81 g, 693 mmol). The kettle was purged with Argon and heated to 90° C. with stirring. Next, ethylenediamine (17.35 ml, 260 mmol; available from Huntsman Chemical Corp.) was added to the dropping funnel, and slowly added to the Pripol dropwise over 5-10 minutes. The kettle was wrapped with cotton wool and foil to maintain temperature, heated to 120° C., then ramped up to 150° C., and finally to 170° C. and held for 4½ hours. Water byproduct was collected in the Dean-Stark trap. After 4.5 hours, the reactor contents were poured into a foil pan to cool and solidify. Organoamide was isolated as a golden viscous semi-solid material (acid#=123.63 mg/g).

Example 3B

Synthesis of Low Molecular Weight Amide Gellant Using Organoamide Precursor (0.75:2 EDA:Pripol)

To a 2 L stainless steel Buchi reactor equipped with 4-blade steel impeller, baffle, and condenser was added low molecular weight organoamide (405 g, acid number=123.26, 445 mmol) via the addition port, using a heat gun to melt the materials. Next, the reactor was purged with N$_2$ gas at 3 SCFH (standard cubic feet per hour) flow rate, and heated to 210° C., and mixing at 450 RPM was started. Next, 2-phenoxyethanol (150 g, 1086 mmol, Aldrich Chemicals) and Fascat 4100 (0.42 g, 2 mmol, Arkema Inc.) were premixed in a beaker, and added to the reaction. The reaction port was closed, and the reaction was held at 210° C. for 5 hours. After the reaction was completed, the molten gellant product was discharged into a foil pan and allowed to cool to room temperature. The produce was an amber-colored soft gel. Acid number=1.37.

Example 4A

Synthesis of Low Molecular Weight Organoamide Precursor (0.8:2 EDA:Pripol)

To a 1 L kettle equipped with polytetrafluoroethylene (PTFE) paddle, dropping funnel, Dean-Stark trap, reflux condenser, and thermocouple probe, was added Pripol 1009 (dimer acid, acid#=194 mg KOH/g; available from Cognis Corp.) (450.54 g, 779 mmol). The kettle was purged with Argon and heated to 90° C. with stirring. Next, ethylenediamine (20.8 ml, 312 mmol; available from Huntsman Chemical Corp.) was added to the dropping funnel, and slowly added to the Pripol dropwise over 5-10 minutes. The kettle was wrapped with cotton wool and foil to maintain temperature, heated to 120° C., then ramped up to 150° C., and finally to 170° C. and held for 4½ hours. Water byproduct was collected in the Dean-Stark trap. After 4.5 hours, the reactor contents were poured into a foil pan to cool and solidify. Organoamide was isolated as a golden viscous semi-solid material (acid#=112.22 mg/g).

Example 4B

Synthesis of Low Molecular Weight Amide Gellant Using Organoamide Precursor (0.8:2 EDA:Pripol)

To a 2 L stainless steel Buchi reactor equipped with 4-blade steel impeller, baffle, and condenser was added low molecular weight organoamide (440 g, acid number=112.22, 440 mmol) via the addition port, using a heat gun to melt the materials. Next, the reactor was purged with N$_2$ gas at 3 SCFH (standard cubic feet per hour) flow rate, and heated to 210° C., and mixing at 450 RPM was started. Next, 2-phenoxyethanol (146 g, 1055 mmol, Aldrich Chemicals) and Fascat 4100 (0.45 g, 2.1 mmol, Arkema Inc.) were premixed in a beaker, and added to the reaction. The reaction port was closed, and the reaction was held at 210° C. for 3 hours. After 3 hours, 15 g more 2-phenoxyethanol was added, and the reaction was continued for an additional 4 hours. After the reaction was completed, the molten gellant product was discharged into a foil pan and allowed to cool to room temperature. The produce was an amber-colored soft gel. Acid number=0.65.

Example 5A

Synthesis of Conventional Organoamide Precursor (1.1:2 EDA:Pripol)

A conventional amide gellant precursor using a EDA:Pripol ratio of 1.125:2 was prepared as follows. To a 2 L stainless steel reactor equipped with baffles and 4-blade impeller was added Pripol 1009 dimer diacid (Cognis Corporation) (703.1 g, acid number=194 mg/g, 1215 mmol). The reactor was purged with argon and heated to 90° C., and the impeller was turned on to 400 RPM. Next, ethylenediamine (Huntsman Chemical Corporation, 21.9 g, 364 mmol) was slowly added through a feed line directly into the reactor over 15 minutes. The reactor temperature was set 95° C. Next, the reactor temperature was ramped up to 165° C. over 280 minutes, and held at 165° C. for 1 hour. Finally, the molten organoamide product was discharged into a foil pan and allowed to cool to room temperature. The product was an amber-coloured solid resin. Acid#: 133.7.

Example 5B

Synthesis of Conventional Amide Gellant Using Conventional Organoamide Precursor conventional amide gellant was prepared from the conventional organoamide precursor prepared in the above example, as follows. To a 2 L stainless steel Buchi reactor equipped with 4-blade steel impeller, baffle, and condenser was added conventional organoamide (711.8 g, acid number=133.7, 614.65 mmol) via the addition port, using a heat gun to melt the materials. Next, the reactor was purged with $N_2$ gas at 3 SCFH (standard cubic feet per hour) flow rate, and heated to 210° C., and mixing at 450 RPM was started. Next, 2-phenoxyethanol (281.2 g, 2035.4 mmol, Aldrich Chemicals) and Fascat 4100 (0.70 g, 3.4 mmol, Arkema Inc.) were premixed in a beaker, and added to the reaction. The reaction port was closed, and the reaction was held at 210° C. for 2.5 hours. After 2.5 hours, the reactor port was opened, and 27.5 g more phenoxyethanol was added, and the reaction was allowed to run for 4 hours. After the reaction was completed, the molten gellant product was discharged into a foil pan and allowed to cool to room temperature. The produce was an amber-colored firm gel. Acid number=3.9.

The resulting gellants (from Examples 1B-5B) and corresponding properties are listed in Table 1 below.

TABLE 1

Summary of Other Low Molecular Weight Gellants

| Example | EDA:Pripol ratio | Gel point/° C. | Room temperature viscosity/cps | Example |
|---|---|---|---|---|
| 1B | 0.25:2 | not detected (<30) | 725 | 1B |
| 2B | 0.6:2 | 59 | $4.2 \times 10^7$ | 2B |
| 3B | 0.75:2 | 68 | $3.3 \times 10^8$ | 3B |
| 4B | 0.8:2 | 69 | $4.7 \times 10^8$ | 4B |
| 5B | 1.1:2 (standard) | 72.5 | $1.1 \times 10^9$ | 5B |

Testing

DSC Measurements

DSC measurements were made on the gellants with varying EDA:Pripol ratios. As shown in FIG. 4, there is a direct correlation between the gellant molecular weight and the gellant Tg.

Tables 2 and 3 provide the ink formulation for a curable solid ink using the standard gellant and the ink formulation for a curable solid ink using the gellant of the present embodiments.

TABLE 2

| Component | Wt percent | Mass (g) |
|---|---|---|
| Conventional Amide gellant | 7.5 | 18.7 |
| Unilin 350 acrylate (PP-U350Ac-4) | 5 | 12.5 |
| SR833S | 61.47 | 153.7 |
| SR399LV | 5.0 | 12.5 |
| Irgacure 379 | 3 | 7.5 |
| Irgacure 819 | 0.5 | 1.3 |
| Esacure KIP150 | 4 | 10.0 |
| Irgastab UV10 | 0.2 | 0.5 |
| 15 wt percent cyan pigment dispersion/SR9003 | 13.3 | 33.3 |
| TOTAL | 100 | 250 |

TABLE 3

| Component | Wt percent | Mass (g) |
|---|---|---|
| Amide gellant (as synthesized in Example 2B) | 7.5 | 18.7 |
| Unilin 350 acrylate (PP-U350Ac-4) | 5 | 12.5 |
| SR833S | 61.47 | 153.7 |
| SR399LV | 5.0 | 12.5 |
| Irgacure 379 | 3 | 7.5 |
| Irgacure 819 | 0.5 | 1.3 |
| Esacure KIP150 | 4 | 10.0 |
| Irgastab UV10 | 0.2 percent | 0.5 |
| 15 wt percent cyan pigment dispersion/SR9003 | 20 percent | 33.3 |
| TOTAL | 100 | 250 |

Printed Ink Images

Inks were printed using a Typhoon printhead (available from Xerox Corp.) on five different substrates, both coated and uncoated papers and plastic: SG Elite (super gloss elite coated paper); 4200 (plain paper); CX (Colour Expressions coated paper); DCEG (Digital Colour Elite Gloss coated paper); SG Elite (Silk Gloss Elite coated paper) and BOPP (biaxially oriented polypropylene plastic film). Photographs were taken through a microscope to qualitatively assess the uniformity. The three particular defects to look for were: pinholes in the film (indicative of poor wetting), ragged or dotted "Morse code" lines (indicative of poor leveling), and white gaps between printed lines (also indicative of poor leveling).

Figure 5:
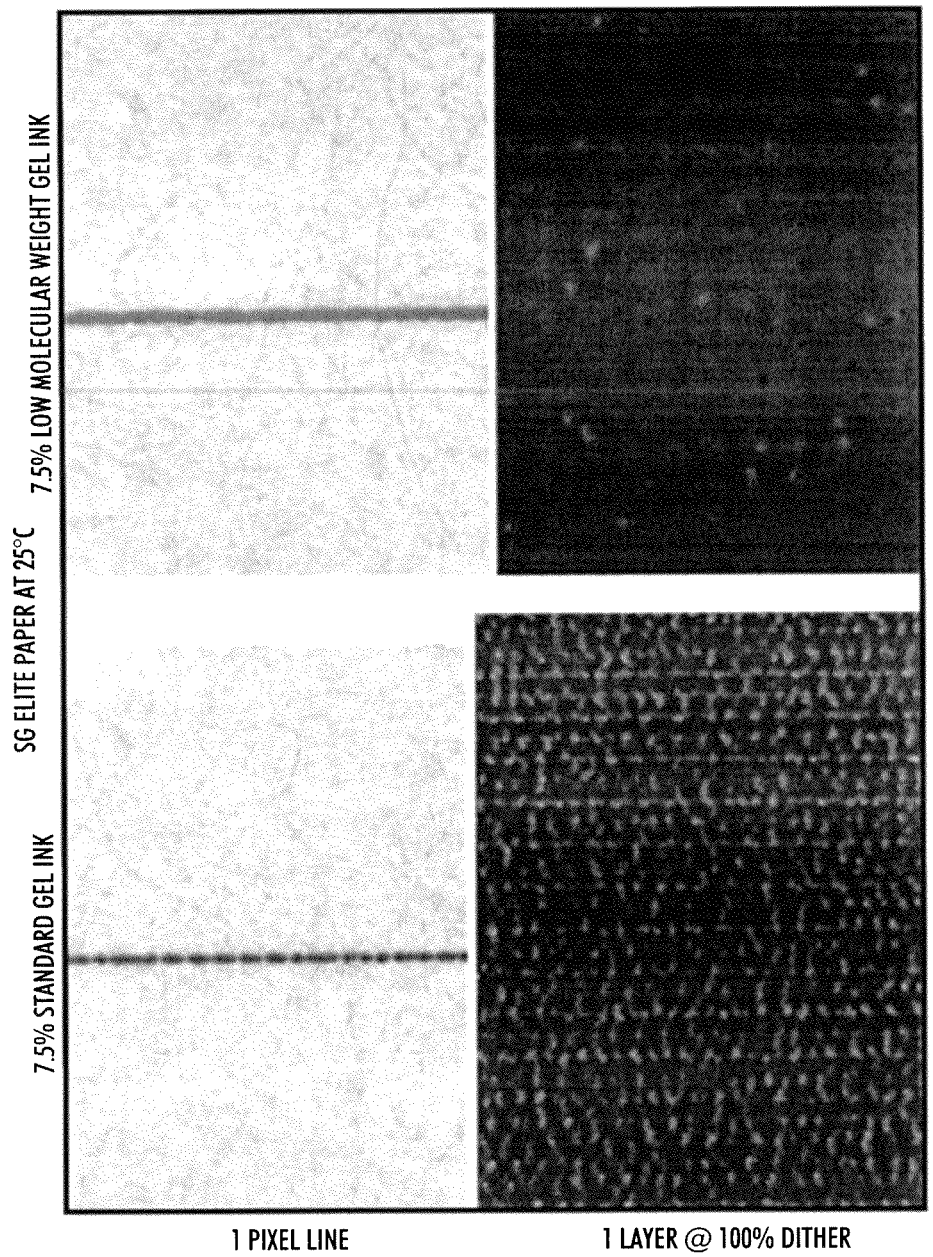
FIG. 5 is a low magnification micrograph showing a print comparison of a standard curable solid ink and a standard curable solid ink made according to the present embodiments.
Figure 6:
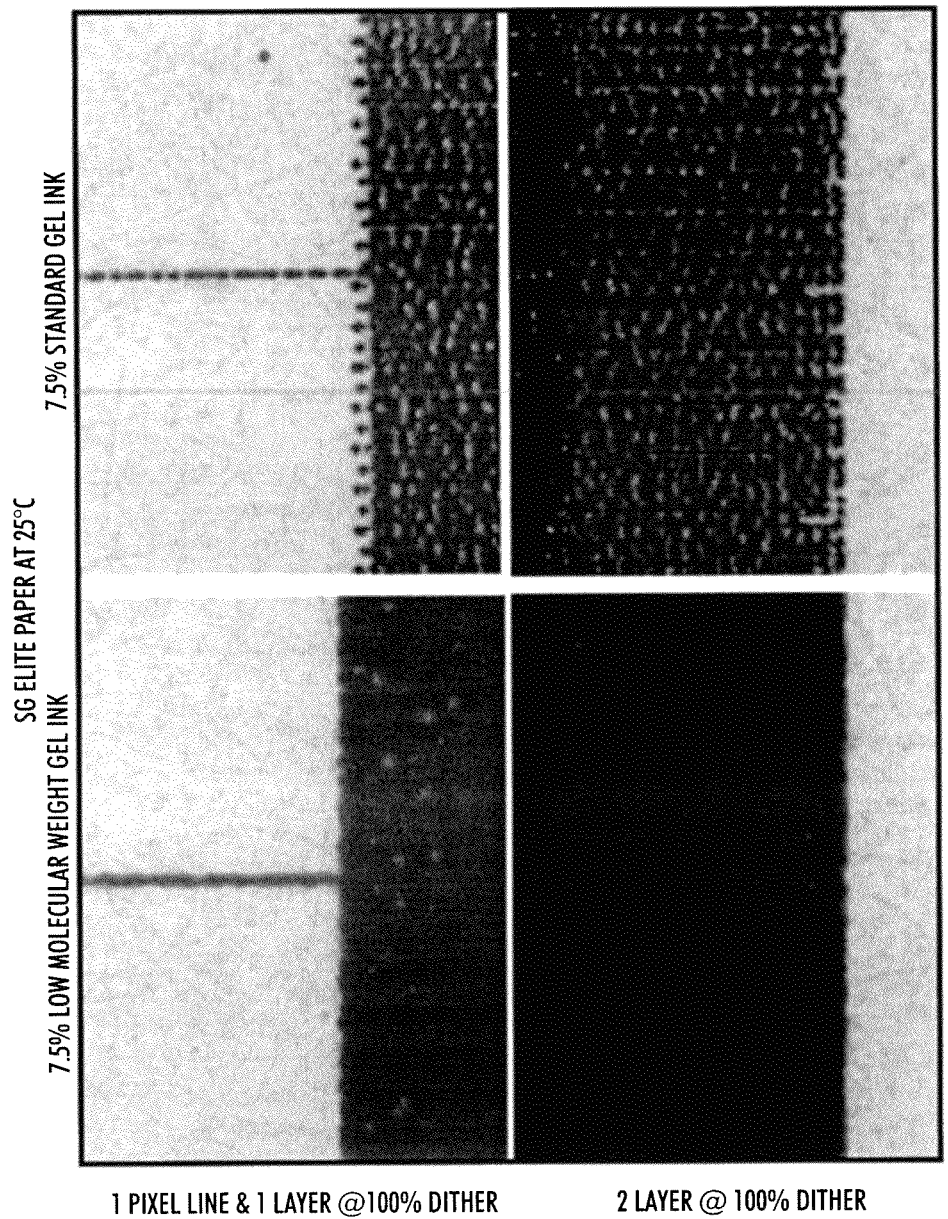
FIG. 6 is a zoomed-in micrograph showing the desirable properties of a printed image provided by the standard curable solid ink made according to the present embodiments as compared to the standard curable solid ink.

FIG. 5 is a low magnification micrograph showing a comparison of two inks: one containing the standard molecular weight amide gellant (Table 2), on left, and one with a low molecular weight amide gellant (Table 3) of the present embodiments, on right. The inventive gel ink shows solid uniformity, and virtually no Morse Code pattern on the printed line. FIG. 6 is a zoomed-in micrograph showing the sharp edge acuity and smoother film afforded by the inventive gel ink, on right, as compared to the standard molecular weight amide gellant, on left.

Experimental data confirmed that it was not possible to attain the same leveling result by changing the percent of the standard gellant alone. The difference in the non-contact leveling performance of the two inks is directly attributed to the lower molecular weight amide gellant.

SUMMARY

In summary, the present embodiments provide lower molecular weight amide gellants with tunable viscoelastic properties and the controlled synthesis of the lower molecular weight amide gellants. There is also provided UV curable inks comprising these lower molecular weight amide gellants which have demonstrated the ability to self-level in a non-contact mode.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A self-leveling curable solid ink comprising
a curable wax;
one or more monomers;
a low molecular weight amide gellant;
a photoinitiator; and
an optional colorant, wherein the low molecular weight amide gellant has a weight average molecular weight of from 800 to 2,500, and has the following formula:

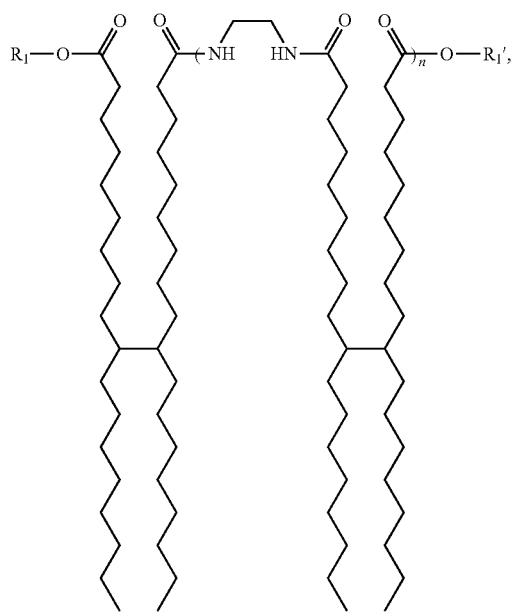

wherein n is 1 to 10, and wherein $R_1$ and $R_1'$ each, independently of the other, are aromatic groups selected from the group consisting of:

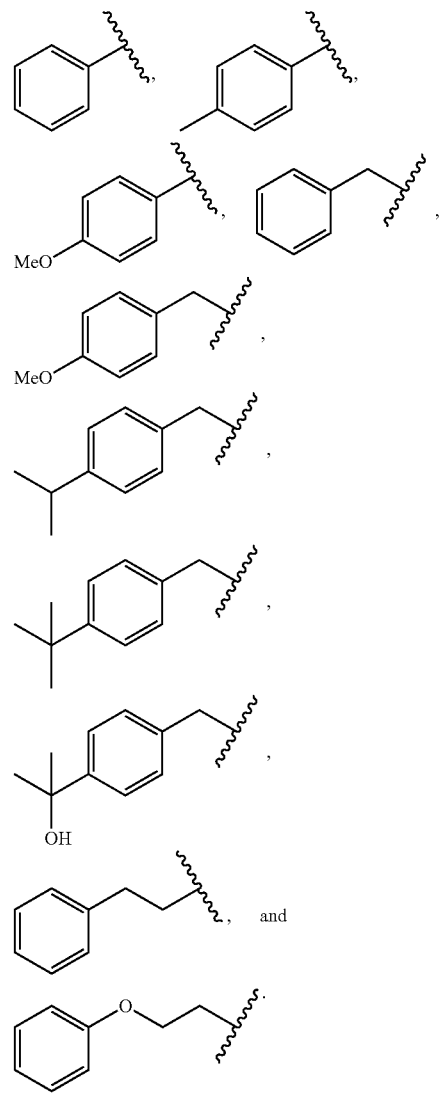

2. The self-leveling curable solid ink of claim 1, wherein the low molecular weight amide gellant has a weight average molecular weight of from 900 to 2,400.

3. The self-leveling curable solid ink of claim 1, wherein the low molecular weight amide gellant has a number average molecular weight of from 500 to 2,500.

4. The self-leveling curable solid ink of claim 3, wherein the low molecular weight amide gellant has a number average molecular weight of from 700 to 2,300.

5. The self-leveling curable solid ink of claim 1, wherein the curable wax is present in the curable solid ink in an amount of from 0.1 to 30 percent by weight of the total weight of the curable solid ink.

6. The self-leveling curable solid ink of claim 1, wherein the one or more monomers are present in the curable solid ink in an amount of from 50 to 95 percent by weight of the total weight of the curable solid ink.

7. The self-leveling curable solid ink of claim 1, wherein the optional colorant is present in the curable solid ink in an amount of from 0.1 to 10 percent by weight of the total weight of the curable solid ink.

8. The self-leveling curable solid ink of claim 1, wherein the low molecular weight amide gellant is present in the curable solid ink in an amount of from 1 to 30 percent by weight of the total weight of the curable solid ink.

9. The self-leveling curable solid ink of claim 1, wherein the photoinitiator is present in the curable solid ink in an amount of from 0.5 to 15 percent by weight of the total weight of the curable solid ink.

10. The self-leveling curable solid ink of claim 1 further comprising a non-curable component, wherein the non-curable component is an ethoxylated octylphenol derivative.

11. The self-leveling curable solid ink of claim 1, wherein a gel point of the low molecular weight amide gellant is from 35° C. to 70° C..

12. The self-leveling curable solid ink of claim 1, wherein a room temperature viscosity of the low molecular weight amide gellant is from 1,000 cps to $4 \times 10^8$ cps.

13. The self-leveling curable solid ink of claim 1 having a gel point of from 20° C. to 70° C..

14. A self-leveling curable solid ink comprising
a curable wax;
one or more monomers;
a low molecular weight amide gellant having a weight average molecular weight of from 800 to 2,500 and a number average molecular weight of from 500 to 2,500;
a photoinitiator; and
an optional colorant.

15. The self-leveling curable solid ink of claim 14 having a gel point of from 20° C. to 70° C. .

16. A method of jet printing an image, comprising:
jetting a self-leveling curable solid ink onto a print substrate to form an image;
leveling the image without any physical contact to the self-leveling curable solid ink; and
exposing the image to radiation to cure the self-leveling curable solid ink on to the print substrate, wherein the self-leveling curable solid ink comprises a curable wax; one or more monomers; a gellant oligomer mixture composition, a photoinitiator, and an optional colorant, wherein the gellant oligomer mixture composition further comprises a low molecular weight amide gellant having a weight average molecular weight of from 800 to 2,500 and having the following formula:

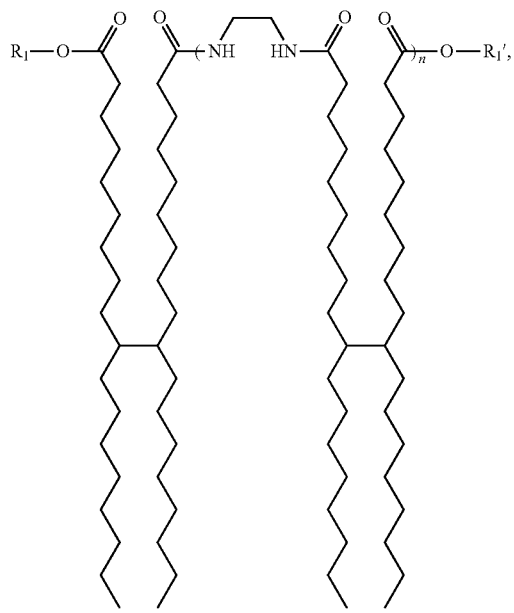

wherein n is 1 to 10, and wherein $R_1$ and $R_1'$ each, independently of the other, are aromatic groups selected from the group consisting of:

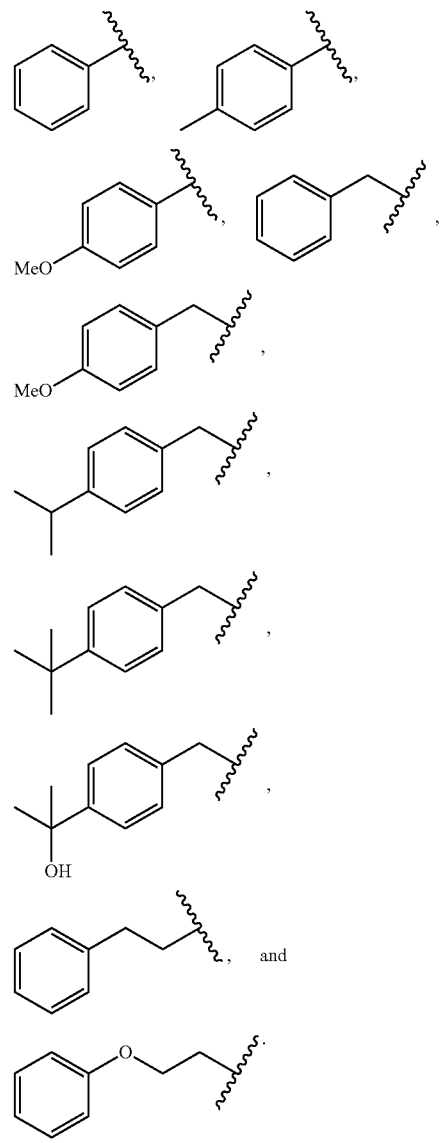

17. The method claim 16, wherein the low molecular weight amide gellant has a weight average molecular weight of from 900 to 2,400.

18. The method claim 16, wherein the low molecular weight amide gellant has a number average molecular weight of from 500 to 2,500.

19. The method claim 18, wherein the low molecular weight amide gellant has a number average molecular weight of from 700 to 2,300.

20. The method of claim 16, wherein the self-leveling curable solid ink has a gel point of from 20° C. to 70° C..

* * * * *